(12) United States Patent
Hwang et al.

(10) Patent No.: US 8,121,413 B2
(45) Date of Patent: Feb. 21, 2012

(54) METHOD AND SYSTEM FOR CONTROLLING BROWSER BY USING IMAGE

(75) Inventors: Jun-Ho Hwang, Seoul (KR);
Byoung-Seok Yang, Gyeonggi-do (KR);
Gun-Pyo Na, Gyeonggi-do (KR);
Dong-Hyun Kim, Seoul (KR); Jong-Tae Kim, Gyeonggi-do (KR)

(73) Assignee: NHN Corporation, Seongnam-si (KR)

( * ) Notice: Subject to any disclaimer, the term of this patent is extended or adjusted under 35 U.S.C. 154(b) by 944 days.

(21) Appl. No.: 12/055,677

(22) Filed: Mar. 26, 2008

(65) Prior Publication Data

US 2009/0003704 A1    Jan. 1, 2009

(30) Foreign Application Priority Data

Jun. 29, 2007  (KR) .................. 10-2007-0065339

(51) Int. Cl.
*G06K 9/62* (2006.01)
(52) U.S. Cl. .................................. 382/189
(58) Field of Classification Search .............. None
See application file for complete search history.

(56) References Cited

U.S. PATENT DOCUMENTS

| | | | | |
|---|---|---|---|---|
| 2004/0223647 A1* | 11/2004 | Blount et al. | ................ | 382/189 |
| 2005/0237308 A1* | 10/2005 | Autio et al. | ................ | 345/173 |
| 2007/0003143 A1 | 1/2007 | Wakai | | |
| 2007/0271283 A1* | 11/2007 | Maryka et al. | ................ | 707/100 |
| 2008/0056578 A1* | 3/2008 | Shilman et al. | ................ | 382/186 |

FOREIGN PATENT DOCUMENTS

| | | |
|---|---|---|
| CN | 1404323 | 3/2003 |
| CN | 1892559 | 1/2007 |
| CN | 1916941 | 2/2007 |
| JP | 10-334187 | 12/1998 |
| JP | 2004-153375 | 5/2004 |
| WO | WO 2004-012135 | 2/2004 |
| WO | 2006/136877 | 12/2006 |

OTHER PUBLICATIONS

Second Office Action issued by the State Intellectual Property Office of P.R. China on Aug. 6, 2010.

\* cited by examiner

*Primary Examiner* — Brian Werner
(74) *Attorney, Agent, or Firm* — H.C. Park & Associates, PLC

(57) ABSTRACT

Browser controlling method and system using an image are provided. The method includes inputting an image; recognizing the image; and executing a command based on the recognized image. Accordingly, the command based on the user's input image can be executed in the browser. Also, since the browser does not need to display various function buttons, the screen can be utilized more efficiently.

15 Claims, 5 Drawing Sheets

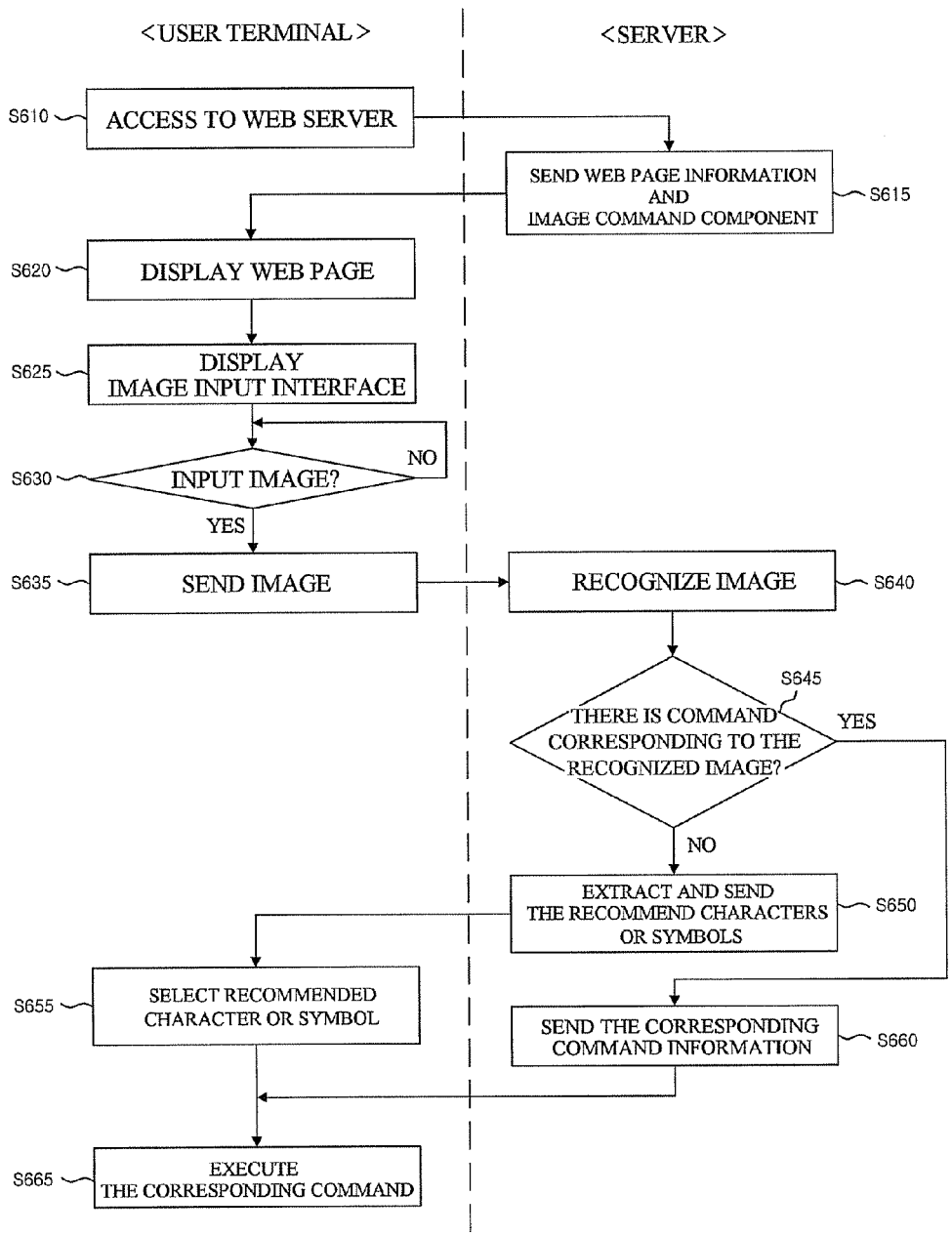

METHOD AND SYSTEM FOR CONTROLLING BROWSER BY USING IMAGE

CROSS-REFERENCE TO RELATED APPLICATIONS

This application claims the benefit under 35 U.S.C. §119 (a) from Korean Patent Application No. 10-2007-0065339 filed on Jun. 29, 2007, the entire disclosure of which is incorporated herein by reference.

BACKGROUND OF THE INVENTION

1. Field of the Invention

The present invention relates to a method and a system for controlling a browser using an image.

2. Description of the Related Art

Recently, with the rapid spread of very high speed Internet, the Internet is a must in a present-day life. Internet users enjoy various web services by accessing to search sites, game sites, or community sites.

To use the web service, the user browses the web by inputting commands and data in a web browser. For instance, the user can acquire his/her intended information by inputting a uniform resource locator (URL) in an address bar during the web surfing, or by inputting a search word in a search box. The user can move to other web pages using web browsing commands such as Back, Forward, Scroll, and Reload.

Typically, the user utilizes a keyboard or a mouse as an input means for the web browsing. The keyboard is used mainly to input texts such as Korean or English alphabets, and the mouse is used mainly to select buttons of the web browser window (e.g., Back, Forward, and Reload) or to select a hyperlink on the web page.

However, while it may be quite easy to input the Korean or English alphabets using the keyboard, it is inconvenient to input Chinese characters, Arabic characters, or various symbols using the keyboard. It is more inconvenient to input those characters in a user terminal without the keyboard. Wireless terminals such as mobile phones and personal digital assistants (PDA) are also subject to the limitation on the number of characters or symbols input through a keypad. As a result, it is hard to input user's intended characters.

Meanwhile, when a small computer or a wireless terminal displays various function buttons and menus in the browser, the region for displaying user's desired information is reduced because of the small screen size.

SUMMARY OF THE INVENTION

An aspect of the present invention provides a method and a system for controlling a browser using an image so as to allow a user to more easily execute a browser command and to efficiently utilize the browser screen.

According to an aspect of the present invention, a browser controlling method comprises allowing a user to input an image data by using an input component. The input image data represents one of at least one character and identification of a predefined command. The method further comprises recognizing one of the at least one character and identification of at least one predefined command based upon the input image data in response to the input of the image data and allowing the user to select one of the recognized at least one character if at least one character is recognized based upon the input image date. The browser controlling method further comprises allowing the user to select one of the recognized at least one predefined command if at least one predefined command is recognized based upon the input image data.

Execution of the command includes executing a browser menu command or a web page menu command corresponding to the recognized image. The execution of the command further includes inputting a character corresponding to the recognized image in a search box. The command can be executed by changing document object model (DOM) objects of a browser.

The browser controlling method further includes extracting and displaying recommended characters or recommended symbols based on the recognized image. The execution of the command includes executing a command corresponding to a character or a symbol selected from the recommended characters or the recommended symbols.

The browser controlling method further includes determining whether there is a command corresponding to the recognized image. The execution of the command includes when the presence of the command corresponding to the recognized image is determined, executing the command corresponding to the recognized image; and when the absence of the command corresponding to the recognized image is determined, executing a command corresponding to a character or a symbol selected from the recommended characters or the recommended symbols based on the recognized image.

A computer-readable medium contains a program for executing the method using a computer.

According to another aspect of the present invention, a browser controlling system comprises means for allowing a user to input an image data by using an input component. An image processing server is configured for receiving the input image data from a user terminal and recognizing the at least one character based upon the input image data. The image processing server sends signal to the user terminal so that the user terminal allows the user to select one of the recognized at least one character.

The command based on the input image can be a command instructing to input a character corresponding to the input image in a search box of a web page.

The command is executed by changing document object model (DOM) objects of a browser.

The image command component recognizes the input image and forwards a command event corresponding to the recognized image to the browser.

The browser controlling system further includes an image processing server for recognizing the input image from the image command component, extracting recommended characters or recommended symbols, and transmitting the recommended characters or the recommended symbols to the user terminal.

The image command component recognizes the image input, determines whether there is a command corresponding to the recognized image, forwards a command event corresponding to the recognized image to the browser when there is the command corresponding to the recognized image, and forwards a command event corresponding to a character or a symbol selected by a user among the recommended characters or the recommended symbols when there is no command corresponding to the recognized image.

The image processing server calculates accuracy while recognizing the input image and sends command information corresponding to the recognized image to the image command component when an accuracy of the recognized image having the highest accuracy is greater than a reference value.

The image processing server determines whether there is a command corresponding to the recognized image, sends command information corresponding to the recognized image to the image command component when there is the command corresponding to the recognized image, and transmits the recommended characters or the recommended symbols to the user terminal when there is no command corresponding to the recognized image.

The image command component displays the recommended characters or the recommended symbols in the user terminal and forwards a command event corresponding to a character or a symbol selected by a user among the recommended characters or the recommended symbols, to the browser.

The image command component calculates accuracy while recognizing the input image and forwards a command event corresponding to the recognized image to the browser when an accuracy of the recognized image having the highest accuracy is greater than a reference value.

The image command component recognizes the input image, extracts recommended characters or recommended symbols, and displays the recommended characters or the recommended symbols to the user terminal.

BRIEF DESCRIPTION OF THE DRAWING FIGURES

FIG. 6 is a flowchart of a browser controlling method using an image according to another embodiment of the present invention.

Figure 1:
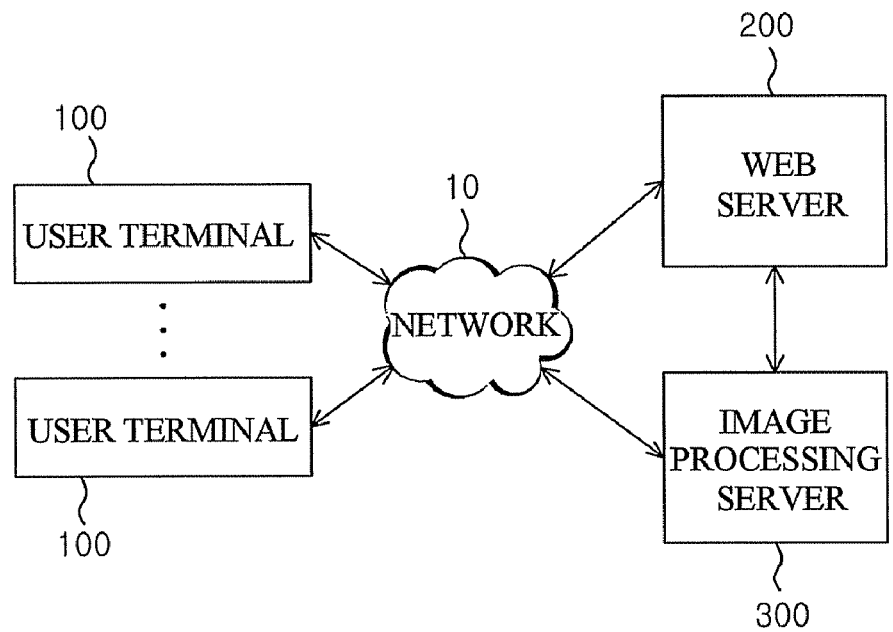
FIG. 1 is a block diagram of a browser controlling system using an image according to an embodiment of the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein. Like numbers utilized throughout the various Figures designate like or similar parts.

DETAILED DESCRIPTION OF THE INVENTION

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
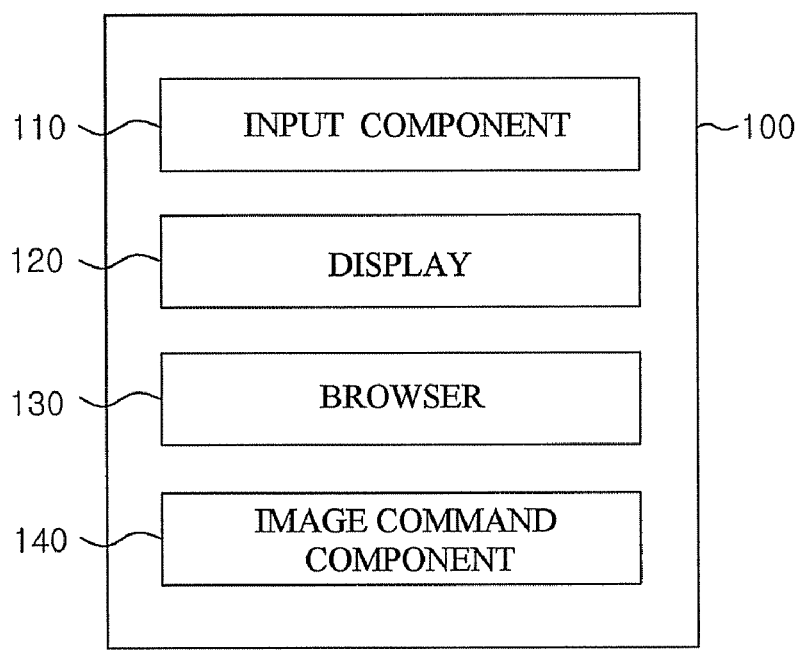
FIG. 2 is a block diagram of a user terminal of FIG. 1.

FIG. 1 is a block diagram of a browser controlling system using an image according to an embodiment of the present invention, and FIG. 2 is a block diagram of a user terminal of FIG. 1.

The browser controlling system of FIG. 1 includes a web server 200 and an image processing server 300, which are connected to a plurality of user terminals 100 over a communication network 10.

The communication network 10 can include data communication networks such as local area network (LAN), metropolitan area network (MAN), wide area network (WAN), and Internet, and telephone networks. The communication network 10 can be wired or wireless regardless of the communication scheme.

The user terminal 100, which is a communication terminal used by a user to use a web service, exchanges information by accessing to the web server 200 over the communication network 10. The user terminal 100 can employ a terminal having the operational capability with a memory means (or memory device) and a microprocessor, such as desktop computer, notebook computer, work station, palmtop computer, ultra mobile personal computer (UMPC), tablet PC, personal digital assistant (PDA), web pad, and mobile phone.

Referring to FIG. 2, the user terminal 100 includes an input component 110, a display 120, a browser 130, and an image command component 140.

The input component 110 receives information or a command from the user. The input component 110 can be implemented using a mouse, a pen mouse, a digital pen, a touch pad, a touch panel, or a tablet, which allow the handwriting input. The user terminal 100 can receive an image from the user through the input component 110.

The display 120 outputs and provides various information to the user. The display 120 can be implemented using a liquid crystal display (LCD), a cathode-ray tube (CRT), and a light emitting diode (LED) monitor. The display 120 may include a touch screen. In this case, the display 120 can function as the input component 110.

A browser 130, which is an application program to fetch a web page, accesses to the web server 200, receives web page information from the web server 200, and displays the corresponding web page in the display 120. Examples of the browser 130 can include, but not limited to, common programs such as Internet Explorer, Netscape, Mozilla, and Firefox. If the user terminal 100 is a wireless terminal, the browser 130 can be a mobile web browser.

An image command component 140 is transmitted from the web server 200 and executed at the user terminal 100. The image command component 140 can include web components, but not limited to, such as Flash, JavaScript, and Active-X. The image command component 140 can recognize an image input by the user by including an image recognition algorithm. The image command component 140 forwards a corresponding event to the browser 130 so that the browser 130 can execute a command corresponding to the recognized image. More specifically, the image command component 140 forwards a command event to a script machine of the browser 130. The script machine can execute the corresponding command by changing cascading style sheets (CSS) by executing a corresponding script or by changing document object model (DOM) objects of the browser 130. For example, a text is written in a text box by changing a value of the TextBox of the text editor DOM object of the browser 130.

Herein, the command is executable in the browser 130. The present invention can employ any commands executable by changing the DOM objects of the browser 130. Examples of the command include menu commands of the browser 130 such as 'Back', 'Forward', 'Stop', 'Reload', 'Home', and 'Favorites', commands for scrolling the web page screen, changing a color of the background screen of the browser 130, or inputting a text in the text box (e.g., search box), and menu commands provided in the web page. Examples of the menus provided in the web page include, but not limited to, a hyperlink to a specific page such as To blog, To e-mail, and To café, and a search for a query input in the search box.

If necessary, the image command component 140 may be implemented to execute only a specific command (e.g., a command for inputting a query in the search box), or to execute only part of commands.

If the recognized images are '.rarw.', '.fwdarw.', 'x', 'R', 'H', and 'F', the commands 'Back', 'Forward', 'Stop', 'Reload', 'Home', and 'Favorites' can be executed respectively. For the images '.uparw.' and '.dwnarw.', Scroll up and Scroll down can be executed respectively. For '(b)', a command for changing the color of the background to the black can be executed. For 'B', 'M' and 'C', To blog, To e-mail, and To cafe can be executed respectively. For 'S', a search command for the query input in the search box can be executed. If the recognized image is other image than the predefined images as above, a character corresponding to the recognized image can be input in the search box. Note that the matching between the images and the commands is a mere example. The user is able to select whether to activate those commands through an option menu provided by the image command component 140 and to match the commands with the images.

The image command component 140 can extract at least one character or symbol (as the recognized image) from the input image and calculate accuracy for the extracted character or symbol when recognizing the input image. When the accuracy of the recognized image with the highest accuracy exceeds a reference value, the image command component 140 provides the command event to the browser 130 to immediately execute the command corresponding to the image. By contrast when the accuracy does not exceed the reference value, the image command component 140 can display recommended characters or recommended symbols corresponding to the recognized image and execute a command as selected by the user.

If necessary, the image command component 140 can send the input image to the web server 200 or the image processing server 300. The image command component 140 can receive recommended character information or recommended symbol information corresponding to the input image, from the web server 200 or the image processing server 300, and display the corresponding recommended characters or symbols in the browser 130. According to a user's selection, the image command component 140 can forward the corresponding event to the browser 130 to execute a command corresponding to the selected recommended character or symbol.

The image command component 140 can be operated independently in other websites than the website provided by the web server 200. For doing so, a button for activating the image command component 140 can be displayed in a menu bar or a tool bar of the browser 130.

Every time the user terminal 100 accesses the web server 200, the image command component 140 can be transmitted from the web server 200 and executed at the user terminal 100. Once transmitted and installed at the user terminal, the image command component 140 may not be re-transmitted from the web server 200, except for the updating.

Referring to FIG. 1, the web server 200 provides web sites for search, games, and communities. Once the user terminal 100 accesses, the web server 200 transmits web page information and the image command component 140 to the user terminal 100 over the communication network 10. The web page information can include information relating to the search, the game, and the community.

The image processing server 300 can include database (not shown) containing character information and symbol information, and an image recognition algorithm. Upon receiving the image from the web server 200 or the user terminal 100, the image processing server 300 recognizes the image through the image recognition algorithm, extracts recommended characters or symbols corresponding to the recognized image from the database, and provides the extracted character or symbol to the user terminal 100 via the web server 200 or directly to the user terminal 100.

The image processing server 300 can calculate accuracy when recognizing the image. When the accuracy of the recognized image with the highest accuracy exceeds a reference value, the image processing server 300 transmits command information corresponding to the image to the image command component 140 to execute the corresponding command right away. When the accuracy does not exceed the reference value, the image processing server 300 transmits the recommended characters or symbols corresponding to the recognized image to the user terminal 100 to execute the command as selected by the user.

The image processing server 300 can extract a plurality of recommended characters or symbols, and transmit the extracted recommended characters or symbols to the web server 200 or the user terminal 100 as the text or the image. The image processing server 300 may be unified with the web server 200, not separately equipped from the web server 200.

Figure 3:
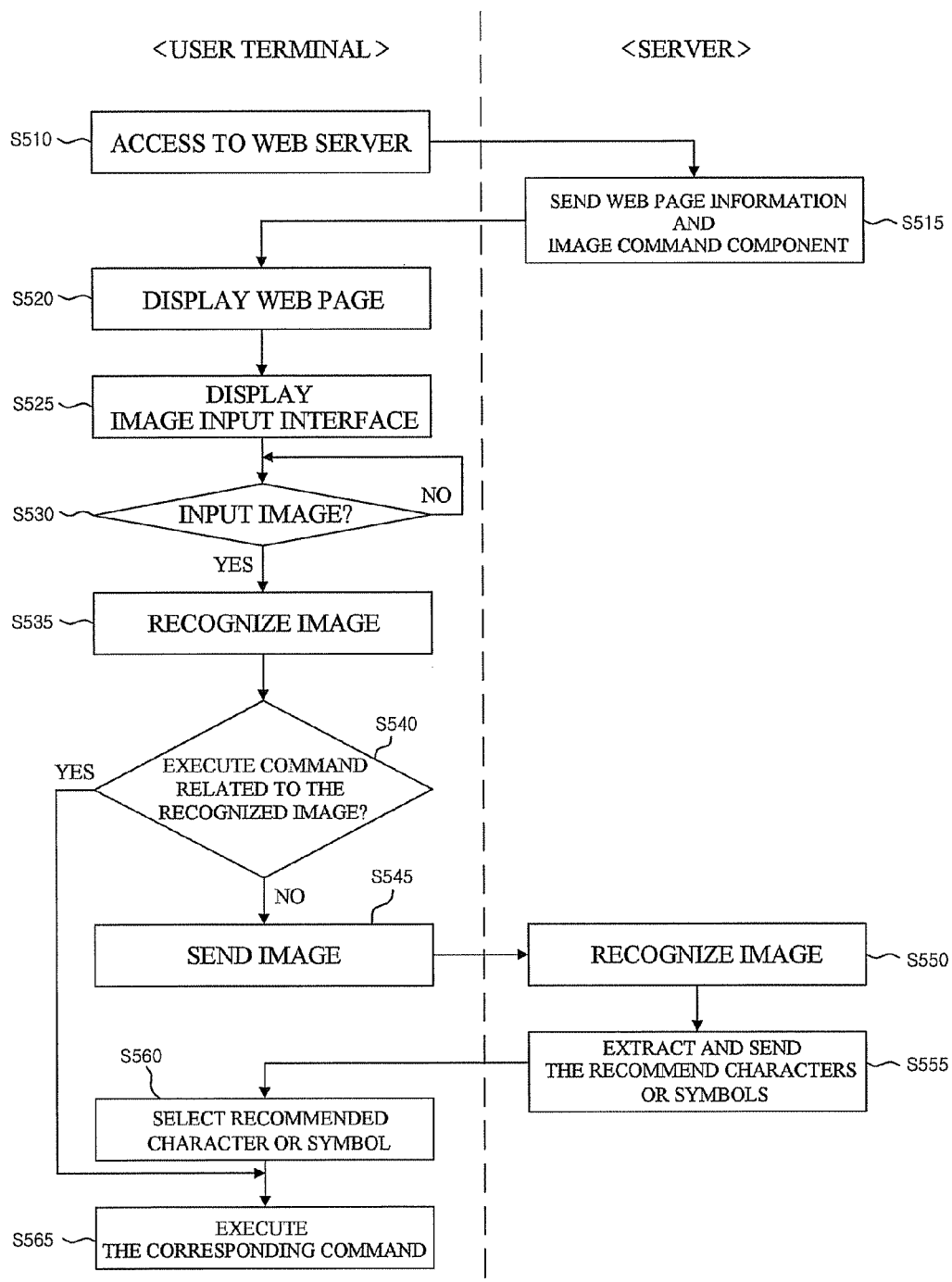
FIG. 3 is a flowchart of a browser controlling method using the image according to an embodiment of the present invention.
Figure 4:
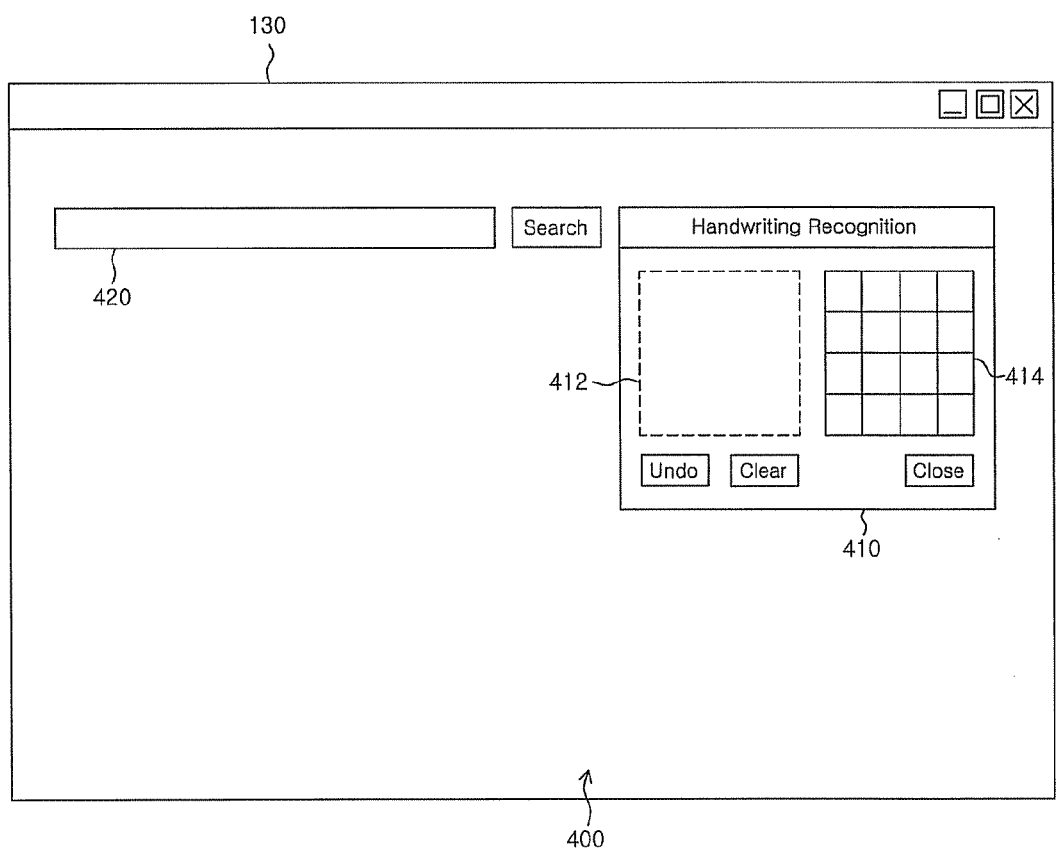
FIG. 4 is a simplified diagram of a web page which executes an image command component according to an embodiment of the present invention.
Figure 5:
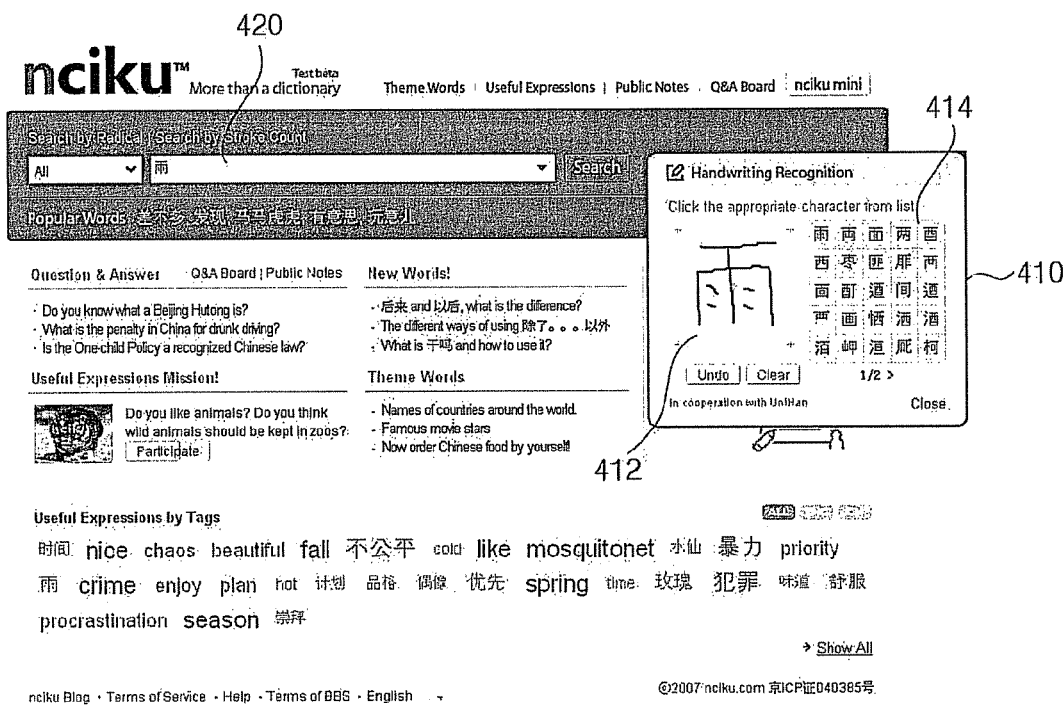
FIG. 5 is a diagram of a web page which realizes an image command component according to an embodiment of the present invention.

Now, a browser controlling method using the image is explained in detail by referring to FIGS. 3, 4 and 5.

FIG. 3 is a flowchart of a browser controlling method using the image according to an embodiment of the present invention, FIG. 4 is a simplified diagram of a web page which executes the image command component according to an embodiment of the present invention, and FIG. 5 is a diagram of a web page which realizes the image command component according to an embodiment of the present invention.

Referring to FIGS. 3 and 4, when the user terminal 100 accesses the web server 200 (S510), the web server 200 transmits the web page information and the image command component 140 to the user terminal 100 (S515). The user terminal 100 displays a web page 400 based on the received web page information in the browser 130 (S520) and displays an image input interface 410 (S525).

The web page 400 displays a search box 420, a Search button, a handwriting recognition button, and the image input interface 410. The web page 400 can display various contents such as search, games, and communities as texts or images.

The image input interface 410 is generated by the image command component 140. The image input interface 410 includes an image input region 412, a recommendation region 414, an Undo button, a Clear button, and a Close button. The image command component 140 can be immediately executed upon the transmission to the user terminal 100 and display the image input interface 410. By contrast, after the user presses the handwriting recognition button or puts the mouse pointer on the handwriting recognition button for a predetermined time, the image command component 140 can be executed and the image input interface 410 can be displayed. As the user displays the image input interface 410 at his/her intended time as in the latter case, other content regions are not intruded and the existing shape and design of the web page can be preserved.

The image command component 140 waits for the image input of the user while the image input interface 410 is still displayed (S530). The user can input the image by drawing a picture in the image input region 412 with a mouse, a digital pen, and a tablet. Instead of inputting the image directly in the image input region 412, the user can let the image be recognized by opening an image file including a character.

The image command component 140 generates image data with coordinate information, input order, click, and release according to the event of the mouse. When the input component 110 is a tablet, additional information relating to the magnitude of pressure can be included to the image data. Thus, the image data can be differently generated depending on how much the pressure is.

As inputting the image, the user can use the Undo button, the Clear button, and the Close button. The Undo button erases the most recent stroke in the image remaining in the image input region 412. The Clear button returns to the empty state for a new image by erasing the entire image input by the user. The Close button vanishes the image input interface 410 in the browser 130 by deactivating the image input interface 410.

When the image is input, the image command component 140 recognizes the input image (S535). While the image recognition can be performed based on the image input upon every stroke, the image may be recognized when the user completes the image input and then presses a recognition button (not shown).

The image command component 140 can extract recommended characters or symbols corresponding to the recognized image and display the extracted recommended characters or symbols in the recommendation region 414. The recommended characters or symbols can be characters or symbols extracted with the accuracy over a predetermined level. However, if the image command component 140 cannot extract the recommended characters or symbols, the image command component 140 may send the input image to the image processing server 300, receive the recommended characters or symbols after the image processing server 300 recognizes the image, and then display the received recommended characters or symbols in the recommendation region 414.

Next, the image command component 140 determines whether it is possible to execute the command relating to the recognized image (S540). More specifically, the image command component 140 determines whether there exists a command corresponding to the recognized image. When there is the corresponding command, the image command component 140 forwards a command event so that the browser 130 executes the corresponding command (S565). When the accuracy of the recognized image having the highest accuracy is greater than the reference value, the image command component 140 determines the presence of the corresponding command.

The image recognizable by the image command component 140 can be limited to characters or symbols directly related to the commands. Accordingly, the image for a general character or symbol for the query input is recognized by the image processing server 300. Since there is no need to hold much data to match the input image to the general characters or symbols, the size of the image command component 140 can be reduced. Herein, the general characters include not only characters difficult to input directly in the search box 420, such as the Chinese characters or the Arabic characters, but also characters such as Korean characters, Kana, and alphabets.

When there is no corresponding command (S540), the image command component 140 sends the input image to the image processing server 300 (S545). The image processing server 300 recognizes the received image (S550), extracts recommended characters or symbols corresponding to the recognized image and sends the extracted recommended characters or symbols to the user terminal 100 (S555). In doing so, the image processing server 300 can send the relevant command scripts together with the recommended characters or symbols, and the image command component 140 provides the command script relating to the selected character of the recommended characters or symbols to the browser 130 to execute the command script.

The image command component 140 displays the received recommended characters or symbols in the recommendation region 414 and waits for the user's selection. When the user selects one of the recommended characters or symbols (S560), the image command component 140 forwards the command event corresponding to the selected character or symbol to the browser 130 to execute the corresponding command (S565). When the character or symbol selected by the user is not directly concerned with the command, the image command component 140 forwards an event to the browser 130 to input as the query in the search box 420. When the browser 130 executes the command, the image input interface 410 is inactivated and disappears.

The image processing server 300 can also send accuracy information about the recommended characters or symbols, and the image command component 140 can display the recommended characters in the recommendation region 414 in the order of the accuracy. When the number of the extracted recommended characters or symbols is greater than the number of characters displayable in the recommendation region 414, the recommendation region 414 can include a plurality of pages. For doing so, a 'next page' button is generated below the recommendation region 414 to represent the next page upon the clicking.

A case where the image input by the user is input as a query and retrieved is illustrated by referring to FIG. 5. When the user draws '雨' in the image input region 412, the image command component 140 determines it as a query input command because the input image is not directly concerned with the control of the browser 130. The image command component 140 sends the image to the image processing server 300, receives its recommended characters from the image processing server 300, and then displays the recommended characters in the recommendation region 414. When the user selects '雨' on the left upper side of the recommendation region 414, the image command component 140 forwards the corresponding event to the browser 130 to input '雨' in the search box 420. Next, when the user draws 'S' in the image input region 412 or clicks the Search button, '雨' is retrieved. '雨' means rain as Chinese character.

As for the query input, a word or a phrase including a plurality of characters can be retrieved by inputting a plurality of images in order before the retrieval. In doing so, the query is generated by inputting the corresponding characters in the search box 420 in order for every image input. Meanwhile, the web server 200 can provide an autocomplete function based on at least one character input in the search box 420 so that the user can easily input his/her intended word to retrieve.

Now, a browser controlling method using the image according to another embodiment of the present invention is explained in detail by referring to FIG. 6. Most of descriptions on another embodiment are substantially similar to one embodiment, the same parts shall not be further described.

FIG. 6 is a flowchart of the browser controlling method using the image according to another embodiment of the present invention.

When the user terminal 100 accesses the web server 200 (S610), the web server 200 transmits the web page information and the image command component 140 to the user terminal 100 (S615). Next, the user terminal 100 displays the web page 400 based on the received web page information in the browser 130 (S620) and displays the image input interface 410 (S625).

The image command component 140 waits for the user's image input while the image input interface 410 is displayed (S630).

When the image is input, the image command component 140 generates and sends image data to the image processing server 300 (S635).

The image processing server 300 recognizes the image based on the image data received from the image command component 140 (S640).

Next, the image processing server 300 determines whether there exists a command corresponding to the recognized image (S645). When there is the corresponding command, the image processing server 300 sends the corresponding command information to the image command component 140 (S660). Accordingly, the image command component 140 forwards a command event to the browser 130 so that the browser 130 executes the corresponding command (S665). When the accuracy of the recognized image having the highest accuracy is greater than the reference value, the image processing server 300 determines the presence of the corresponding command.

When the corresponding command is absent (S645), the image processing server 300 extracts and transmits recommended characters or symbols of the recognized image to the user terminal 100 (S650). The recommended characters or symbols can be characters or symbols having the accuracy over a predetermined level. In doing so, the image processing server 300 can send relevant command scripts together with the recommended characters or symbols.

The image command component 140 displays the received recommended characters or symbols in the recommendation region 414 and waits for the user's selection. When the user selects one of the recommended characters or symbols (S655), the image command component 140 sends a command event corresponding to the selected character or symbol to the browser 130 to execute the corresponding command (S665).

As above, the image command component 140 does not recognize the image and does not determine whether there exists the command corresponding to the image. Instead, the image processing server 300 performs those functions. Since the image command component 140 does not require the image recognition algorithm and the determination module, the size of the image command component 140 can be far more reduced.

In light of the foregoing, the browser controlling method and system using the image allow to input the image everywhere the browser 130 is provided when the user needs to, by displaying the image input interface 410 provided from the web server 200, without installing a specific application program. The user can control the browser 130 by changing the DOM objects of the browser 130 based on the image input by the user. Therefore, the command corresponding to the input image can be executed in the browser 130.

Accordingly, a UMPC and a tablet PC without a keyboard can enhance its accessibility to the web service freely from the input device or the operating system. In addition, it is easier to input the complicated Chinese characters or Arabic characters in the search box, and to generate a query based on geometrical symbols which are difficult to represent using the characters. As a result, the search results in the retrieval service can be improved and the search query can be input conveniently, to thus elevate the user satisfaction.

The embodiment of the present invention includes a computer-readable medium including program commands to execute operations realized by various computers. The medium contains a program for executing the browser controlling method using the image according to the present invention. The medium can contain program commands, data files, and data structures alone or in combination. Examples of the medium include a magnetic medium such as hard disk, floppy disk, and magnetic tape, an optical recording medium such as CD and DVD, a magneto-optical medium such as floptical disk, and a hardware device containing and executing program commands, such as ROM, RAM, and flash memory. The medium can be a transmission medium, such as optical or metallic line and waveguide, including subcarriers which carry signals to define program commands and data structure. Examples of the program commands include a machine language created by a compiler and a high-level language executable by the computer using an interpreter.

As set forth above, the user can control the browser by changing the DOM objects of the browser based on the user's input image, and execute the command corresponding to the input image in the browser.

The usage of the browser can be facilitated and the access to the web service can be enhanced. Since it is easier to input the complicated Chinese characters or Arabic characters in the search box and to generate the query based on the symbols, the user satisfaction can be raised.

Further, since the browser does not have to display various function buttons, the screen can be utilized more efficiently.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

It will be understood that as used herein, the terms "connected" and "electrically connected" are defined to include a direct connection of two or more elements, or to include an indirect connection of two or more elements connected through one or more other elements.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first, second and third are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:
   receiving input image data comprising a character or a symbol;
   determining whether the received input image data matches a command and whether the input image data belongs to controlling a browser or searching for a query input, wherein a database is configured to store a plurality of the characters or symbols; and
   providing, in response to a determination that the input image data does not match the command, a recommended character or symbol to a region of a user terminal, wherein the recommended character or symbol is selected and a command corresponding to the selected character or symbol is executed, the executed command either controls a function of the browser or inputs a query to a browser, and wherein
   the selected recommended character or symbol is transferred to a search box in response to the selected recommended character or symbol being determined for searching for a query input.

2. The method of claim 1, wherein the command comprises a browser menu command or a web page menu command.

3. The method of claim 1, wherein the command is executed by changing document object model (DOM) objects of a browser.

4. A method, comprising:
   receiving input image data comprising a plurality of characters or symbols;
   determining the received input image data whether to match a command and whether the input image data belongs to the controlling a browser or the searching for a query input to execute the command, the determination is performed by recognizing one of the characters or symbols and identification of at least one predefined command corresponding to the input image data; and
   providing, in response to a determination that the input image data does not match the command, a recommended character or symbol to a region of a user terminal, wherein the recommended character or symbol is selected and a command corresponding to the selected character or symbol is executed, the executed command either controls a function of the browser or inputs a query to a browser, and wherein
   the selected recommended character or symbol is transferred to a search box in response to the selected recommended character or symbol being determined for searching for a query input.

5. The method of claim 4, wherein the predefined command comprises a browser menu command or a web page menu command.

6. A non-transitory computer-readable storage medium comprising an executable program, which when executed by a processor, performs steps of:
   providing input image data, the input image data representing one of at least one character or symbol and corresponding to a predefined command;
   determining one of at least one character or symbol and identification of at least one predefined command corresponding to the input image data in response to an input image data being selected, wherein the input image data is determined whether to control a browser or to search for a query input; and
   providing, in response to a determination that the input image data does not match the predefined command, a recommended character or symbol to a region of a user terminal,
   wherein a command corresponding to the selected input of the image data is executed, the executed command either controls a function of the browser or inputs a query to the browser according to the determination, and wherein the selected input image data is transferred to a search box in response to the selected input image data being determined for searching for a query input.

7. The non-transitory computer-readable storage medium of claim 6, further comprising:
   determining whether the input image data belongs to the controlling a browser or the searching for a query input.

8. The non-transitory computer-readable storage medium of claim 6, wherein the predetermined command comprises at least one of a browser menu command and a web page menu command.

9. A system comprising:
   means for receiving input image data, the input image data representing one of at least one character or symbol associated with controlling browser or searching for a query input;
   means for determining whether the received input image data being matched to a command to execute the command and determining whether the input image data belongs to the controlling a browser or the searching for a query input; and
   means for providing, in response to a determination that the input image data does not match the command, a recommended character or symbol to a region of a user terminal, wherein the recommended character or symbol is selected and a command corresponding to the selected character or symbol is executed, the executed command either controls a function of the browser or inputs a query to the browser, and wherein
   the selected recommended character or symbol is transferred to a search box in response to the selected recommended character or symbol being determined for searching for a query input.

10. The system of claim 9, further comprising:
    means for determining whether the input image data belongs to the controlling a browser or the searching for a query input.

11. The system of claim 9, further comprising:
    means for displaying at least one recommended characters or symbols.

12. The system of claim 9, further comprising:
    image processing server is configured to calculate an accuracy of the input image data by recognizing at least one character or symbol and to send character information corresponding to the recognized at least one character to the user terminal when the accuracy meets a predetermined reference value.

13. An apparatus comprising:

means for receiving input image data, the input image data corresponding to one of a character or a symbol corresponding a predefined command;

means for recognizing the character or the symbol to determine the predefined command based upon the received input image data;

means for determining whether the input image data belongs to controlling a browser or searching for a query input; and means for displaying, in response to a determination that the input image data does not match the command, a recommended character or symbol to a region of a user terminal, wherein the recommended character or symbol is selected and a command corresponding to the selected character or symbol is executed, the executed command either controls a function of the browser or inputs a query to the browser, and wherein the selected recommended character or symbol is transferred to a search box in response the selected recommended character or symbol being determined for searching for a query input.

14. The apparatus of claim 13, further comprising:

means for determining whether the input image data belongs to the controlling a browser or the searching for a query input.

15. The apparatus of claim 14, further comprising:

means for calculating an accuracy of the input image data while recognizing identification of at least one predefined command.

* * * * *